3,216,786
RECOVERY OF HEAVY METALS FROM SOLUTIONS

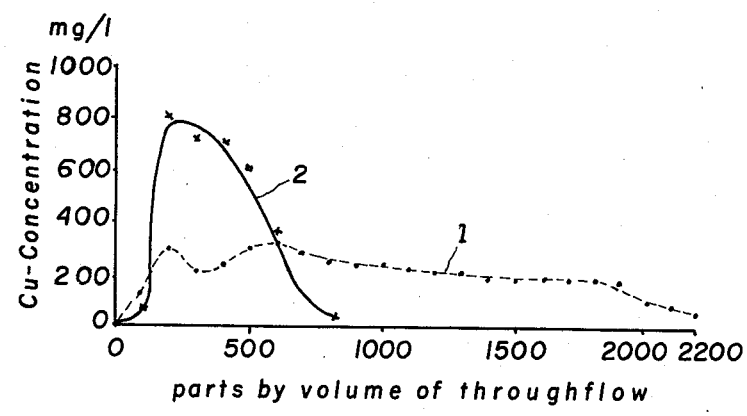

Herbert Corte and Erhard Meier, Leverkusen, Germany, assignors to Farbenfabriken Bayer Aktiengesellschaft, Leverkusen, Germany, a German corporation
Filed Apr. 15, 1958, Ser. No. 728,581
Claims priority, application Germany, Apr. 20, 1957, F 22,879
9 Claims. (Cl. 23—14.5)

The present invention relates to a process for recovering heavy metals from solutions with the aid of ion exchangers and more specially with the aid of weakly acid cation exchangers having sponge structure.

It is known that the metal can be recovered from ammoniacal copper solutions by filtering the solutions through cation exchangers. The copper ions then combine with the cation exchangers and can again be brought into solution by treating the charged exchangers with mineral acids or neutral salts, such as ammonium carbonate or sulphates. This process is used on a large scale. Condensation products of phenol, sodium sulphite and formaldehyde are used in this process as cation exchangers.

It is also known that it is possible to fix heavy metal ions from neutral or acid solutions, such as for example $Cr^{III}$ ions, on strongly acid cation exchangers, for example with sulphonated copolymers of styrene and divinyl benzene, and that it is then possible to bring them into solution again by a treatment with mineral acids.

In view of the strongly acid character of the exchangers, regeneration necessitates the use of a considerable excess and also a relatively high concentration of the regenerating agent.

It has now been found that it is possible to work more advantageously, both from a technological and from an economic point of view, if weakly acid cation exchangers having a spongy structure are used for fixing heavy metal ions on heavy metal complex ions. These exchangers contain as cation exchanging groups carboxylic acid, phosphonic acid or phosphinic acid groups, said groups being bonded to cross-linked resin matrices of copolymerized monoethylenically unsaturated monomers and polyethylenically unsaturated monomers. These resins are hard, infusable and water insoluble. Moreover, they are opaque, the opaqueness being due to the presence of small pores in the resins.

Such exchangers are for example disclosed in the co-pending application entitled "Cation Exchangers with Sponge Structure" filed in the name of Herbert Corte, Erhard Meier and Hans Seifert Serial No. 727,045, filed April 8, 1958. According to this application the cross-linked resin matrices of the said cation exchangers are obtained by carrying out the copolymerization of the monoethylenically unsaturated monomers and the polyethylenically unsaturated monomers in the presence of at least 10%, (based on the weight of the monomers) of solvents which will dissolve the monomers but are not able to dissolve linear aromatic vinyl polymers such as polystyrene. Such organic liquids, which are hereinafter referred to as "non-solvents," are for example aliphatic hydrocarbons, alcohols, ethers, nitro-compounds.

The polymers obtained in the presence of at least 10% but preferably at least 30% of these organic liquids are opaque and, depending on the amount of non-solvents used, are glossy to dull. The upper limit of the amount of non-solvents as based on the weight of the monomers is preferably 200 to 300% and depends on the amount of cross-linking agents applied in the polymerization mixture. These polymers have a sponge structure, i.e. they are permeated by small veins, into which non-solvents and non-swelling agents are also able to penetrate. Whereas the normal gel-like polymers are not able to absorb the non-solvents and, therefore, do not swell therein, the sponge-like polymers also absorb these organic liquids and even show a swelling because of their sponge structure.

This sponge structure of the polymers is also maintained during subsequent chemical reactions to which they may be subjected, such as for example saponification or phosphonation, without destruction of the individual particles.

For the production of cation exchangers having carboxylic acid, phosphonic acid or phosphinic acid groups there may be used copolymers of monovinyl aromatic compounds and cross-linking agents having several olefinically unsaturated groups. All monovinylaromatic compounds, such as for example styrene, methyl styrene, vinyl anisole, vinyl naphthalene, as well as mixtures thereof can be used for this purpose. Polyethylenically unsaturated compounds (that is to say compounds containing at least two vinyliden ($CH_2=C<$) or ethylene

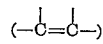

groups) such as for example divinyl benzene, trivinyl benzene, ethylene glycol dimethacrylate, ethylene glycol diacrylate, diallylmaleate, divinylether, polymerizable esterification products of dihydric alcohols, such as glycol, diethyleneglycol, butanediol, and α—β—ethylenically unsaturated acids such as maleic, fumaric acids, such as glycol dimaleate and divinyl ketone can be considered as cross-linking agents. The amounts of cross-linking agents to be used can fluctuate within wide limits but generally between about 0.5 to 50% by weight as based on the total amount of monomers are used. In the case of aromatic compounds having several vinyl groups, these percentages can, however, be exceeded. It is even possible to use these monomers exclusively for the production of the polymers. For the production of cation exchangers with carboxylic acid groups the aforementioned cross-linking agents, preferably polyvinyl aromatic compounds, are copolymerized with monoethylenically unsaturated carboxylic acids, such as acrylic acid, methacrylic acid, half esters of lower aliphatic alcohols with monomethylenically unsaturated polycarboxylic acids such as maleic acid, fumaric acid or mixtures thereof. It is also possible to use the completely esterified derivatives of such acids or the anhydrides thereof with subsequent saponification of the copolymers obtained.

Substances which can be used as non-solvents are for example aliphatic hydrocarbons such as benzine (B.P. 100 to 140° C.), white spirit (B.P. 160 to 196° C.), dodecane, aliphatic and cycloaliphatic alcohols, cyclohexanol, methanol, amyl alcohol, dodecanol, olenin alcohol, aliphatic nitro compounds such as nitromethane, nitropropane, nitrohexane, ethers such as diethylether, dibutylether, diamylether. For producing the polymers, the monomers can be dissolved in the said non-solvents and thereafter polymerized in the presence of a free radical catalyst. For the production of bead-shaped polymers, the solutions of the monomers are suspended in aqueous medium and then polymerized. In this case, it is preferred to use non-solvents which have only slight solubility in water, such as for example n-decanol, olein alcohol, aliphatic hydrocarbons such as white spirit or those which are preferentially dissolved in the monomer mixture, such as for example n-amyl alcohol. The free radical catalysts are those which give off oxygen, such as for example benzoyl peroxide, cumene hydroperoxide, tertiary butyl peroxide, and other per-compounds, e.g. sodium persulfate and azo-compounds such as azodiisobutyric acid dinitrile. It is also possible for this purpose to use Redox systems which in known manner consist of a combination of compounds giving off oxygen and compounds having reducing properties.

The polymerization is preferably carried out at temperatures from 30° to 150° C. The cross-linked polymers then obtained can be subjected to the further reactions such saponification, reaction with $PCl_3$ according to known processes as they are disclosed in the U.S. patent specifications 2,340,110, 2,340,111, 2,409,861, 2,471,818, 2,764,561, 2,764,564, these reactions being carried out either without or after having removed the non-solvents.

These exchangers are suitable for fixing the heavy metal cations from alkaline or ammoniacal aqueous solutions or from aqueous neutral salt solutions, in which the anions of said heavy metal salts are less strongly dissociated than the acid radical of the exchanger. As compared with the strongly acid exchangers, there is the advantage that the regeneration can be carried out by using quite dilute solutions of mineral acids, which can themselves contain metal ions. Furthermore, organic acids, such as for example acetic acid, can be used for regeneration purposes.

Moreover, when these exchangers are used, the regeneration proceeds substantially more quickly than with weakly acid exchangers not having a spongy structure, so that the circulation of an excess quantity of acid is unnecessary. Furthermore, with these exchangers there is the further advantage that the concentration of the metal ions in the regenerated product, for the same throughflow, is substantially higher than with corresponding exchangers not having a spongy structure.

The process can be used for the recovery of any heavy metal, for example Cu, Ag, Au, Zn, Ni, Co, Cr, rare earths, Ur and Th. For carrying out the process of the present invention these metals are applied in the form of aqueous solutions in which the metals are present in the form of cations or of cationic complexes. As anions for these compounds there come into question the anions of organic and inorganic acids, such as hydrochloric, hydrobromic, hydrofluoric, sulfuric, sulfurous nitric, hydrocyanic, thiocyano acetic, propionic, benzoic, citric, tartaric acid. As complex formers there may be cited by way of example ammonia, amines, such as ethylenediamine, diethylene-triamine, propylendiamine. The concentration of the said solutions of heavy metal compounds is preferably one normal or lower, although also higher concentrations come into question. The pH value of said solutions is preferably at least 4, for instance 5 to 12.

In the following examples, the parts indicated are parts by volume:

Example 1

100 parts by volume of cation exchanger were in each case introduced into a filter. These cation exchangers were charged at a specific charging of 5–7 (5–7 litres per litre exchanger per 1 hour) with an ammoniacal cuprous solution (of 778 mg. of CuCl, 1067 mg. of $NH_3$ and 1076 mg. of ammonium acetate) until it was possible to detect Cu in the discharge liquid. Thereafter, 20% acetic acid (in the following table referred to a regenerate) was filtered through the filter, also with the specific charging of 5, until it was no longer possible to detect any Cu in the discharge liquid.

The following table gives the results with the different cation exchangers.

| Type of cation exchanger | Parts of solution filtered through | Cu-absorption, kg./100 ltrs. of exchanger | Parts of regenerate | Kg. of Cu in regenerate | Percent of Cu in regenerate |
| --- | --- | --- | --- | --- | --- |
| (1) Resin produced from phenol $H_2CO.Na_2SO_3$ | 6,200 | 3.08 | 5,000 | 1.8 | 58.5 |
| (2) Cross-linked polyacrylic acid | 8,900 | 4.45 | 2,200 | 4.46 | 100 |
| (3) Cross-linked polyacrylic acid, highly porous | 6,800 | 3.40 | 800 | 3.38 | 100 |

The accompanying curves I and II show the Cu content in the regenerate in dependence on the throughflow. Curve I illustrates the copper concentration of the regenerate which is used for regenerating the exhausted cross-inked polyacrylic acid cited under 2 of the above table, whereas curve II illustrates the copper content of the regenerate used for regenerating the highly porous cross-linked polyacrylic acid referred to under 3 in the above table.

The aforementioned highly porous cross-linked polyacrylic acid was obtained as follows:

A mixture of 382 g. of acrylic acid methyl ester, 218 g. of technical divinyl benzene (55%, the remainder being ethyl styrene), 240 g. of n-decanol and 5 g. of benzoyl peroxide was suspended in 1.2 litres of water containing 0.05% of methyl cellulose and subjected to pearl polymerization at 70° C. After gelling of the pearls obtained polymerization was continued for another 3 hours at 90° C. and thereafter the resulting pearls were dried in vacuo and the n-decanol distilled off at 100° C. The pearl polymer thus obtained was boiled under reflux for 20 hours after the addition of 500 cc. of 40% KOH and 300 cc. of methanol. After the reaction liquid had been filtered with suction, the white non-transparent pearls were stirred with excess 10% HCl and then washed with water. Yield: 1500 cc. of a weakly acid cation exchanger.

The spongy structure of the product can be seen from the fact that it reacts for example with 1% $Na_2HPO_4$ solution about 6 times as quickly, with formation of $NaH_2PO_4$, as a corresponding cation exchanger with a gel structure produced without the addition of n-decanol. In addition, the cation exchanger in accordance with the invention, in spite of its approximately 20% divinyl benzene cross-linking, reacts with $Na_2HPO_4$ solution at approximately the same speed as a cation exchanger which is of the same type and with a gel structure but which is cross-linked with only 6% of divinyl benzene, but has the advantage over this latter exchanger of only swelling by 25% in this reaction, whereas the increase in volume of the 6% cross-linked exchanger is 130%.

In the above process the n-decanol may be replaced by the same amount of white spirit.

The cross-linked polyacrylic acid cited above under (2) was obtained in the same manner as the aforementioned highly porous product with the exception that no organic solvent was present during the polymerization of the monomers.

Example 2

Under the same conditions as in Example 1, a filter which was filled with 100 parts of volume of a highly porous exchanger with a base of cross-linked polyacrylic acid was charged with a nickel acetate solution (330 mg. Ni/litre).

After 9000 parts by volume, the Ni began to appear in the discharge. By regeneration with 20% acetic acid, 2.9 kg. of Ni/100 parts by volume were recovered with a maximum concentration of 15.3 g./l.

Example 3

Under the same conditions as in Example 1, 100 parts of volume of a highly porous cation exchanger with a base of cross-linked polyacrylic acid were charged with an $UO_2(CH_3COO)_2$=solution (about 115 mg./l.=80 mg.·$UO_2$). Thereby, about 185 m.³ were liberated from the $UO_2$ content, i.e. 14.7 kg. of $UO_2$ were adsorbed. By regeneration with 20% $CH_3COOH$, 14.5 kg. of $UO_2$ were recovered with a maximum concentration of 5.7 g./l.

Example 4

Under the same conditions as in Example 1, 100 parts of volume each of a cation exchanger were charged with an ammoniacal $Cu^{II}$-solution (500 mg. of $Cu^{II}$/l, 2500 mg. $NH_3$/l.) until it was possible to detect Cu in the discharge liquid. Thereupon, regeneration was effected with 4% of $H_2SO_4$.

The following table gives the results with the different cation exchangers.

| Type of cation exchanger | m.³ of solution filtered through | Cu-absorption, kg./100 ltrs. of exchanger | Parts of regenerate | Kg. of Cu in regenerate | Percent of Cu in regenerate |
|---|---|---|---|---|---|
| (1) Resin produced from phenol $CH_2O$,$Na_2SO_3$ | 8 | 4 | 800 | 3.68 | 92 |
| (2) Cross-linked polyacrylic acid, highly porous | 11.4 | 5.7 | 700 | 5.7 | 100 |

We claim:

1. A process for recovering heavy metals from solutions comprising (1) contacting solutions having a pH of at least 4 and containing compounds in which said metals are present as cations, with a weakly acid cation exchange resin having a sponge structure; said cation exchange resin having a cross-linked matrix to which is bonded a member selected from the group consisting of carboxylic acid, phosphonic acid, and phosphinic acid groups, said matrix being obtained by copolymerizing 0.5–50 parts by weight of polyethylenically unsaturated monomer and 95.5–50 parts by weight of monoethylenically unsaturated monomer, the copolymerization being conducted in 10 to 300% by weight of an organic liquid based on the total weight of monomers, in which said monomers are soluble and in which linear polymers of monoethylenically unsaturated monomers are substantially insoluble, removing the occluded organic liquid from the resulting cross-linked copolymer to obtain a spongy structure; and thereafter (2) regenerating the weakly acid cation exchange resin by washing it with an acid to remove adsorbed heavy metal ions therefrom.

2. A process of claim 1, wherein said heavy metals are selected from the group consisting of Cu, Ag, Au, Zn, Ni, Co, Cr, rare earths, Ur, Th.

3. A process of claim 1, wherein said organic liquid is selected from the group consisting of aliphatic hydrocarbons, aliphatic and cycloaliphatic alcohols, aliphatic ethers, and aliphatic nitro compounds.

4. A process of claim 1, wherein said polyethylenically unsaturated monomers are polyvinyl aromatic monomers.

5. A process of claim 1, wherein said weakly acid cation exchange resin having a sponge structure is a resin containing copolymerized therein a monoethylenically unsaturated carboxylic acid and a polyvinylaromatic monomer.

6. A process of claim 1, wherein said weakly acid cation exchange resin having a sponge structure is a resin containing copolymerized therein an acrylic acid and divinylbenzene.

7. A process of claim 1, wherein said matrix is a copolymer containing copolymerized therein an ester of a monoethylenically unsaturated carboxylic acid and a polyvinylaromatic compound.

8. A process of claim 1, wherein said matrix is a copolymer containing copolymerized therein methylacrylate and divinylbenzene.

9. A process of claim 1, wherein said ion exchange resin is regenerated with an aqueous solution of an organic acid.

References Cited by the Examiner

UNITED STATES PATENTS

| 2,591,573 | 4/52 | McBurney | 260—2.1 |
| 2,591,574 | 4/52 | McBurney | 260—2.1 |
| 2,597,440 | 5/52 | Bodamer | 260—2.1 |
| 2,629,710 | 2/53 | McBurney | 260—2.1 |
| 2,863,718 | 12/58 | Overholt et al. | |

OTHER REFERENCES

"Behavior of Ion Exchange Resins in Solvents Other than Water," Bodamer and Kunin. Industrial and Chemical Engineering, vol. 45, November, 1953. Pages 2577–2580.

"Ion Exchange Process for Recovery of Gold from Cyanide Solution," Burstall et al., Industrial and Engineering Chemistry, vol. 45, August, 1953. Pages 1648–1658.

"Ion Exchange Technology" (Nachod et al.), published by Academic Press, Inc. (New York) 1956, (pages 97 and 287 relied on).

BENJAMIN HENKIN, *Primary Examiner.*

CLYDE C. LE ROY; RAY K. WINDHAM, ROGER L. CAMPBELL, DAVID L. RECK, *Examiners.*